(12) United States Patent
Fujimoto et al.

(10) Patent No.: US 6,522,097 B2
(45) Date of Patent: Feb. 18, 2003

(54) POSITION DETECTING APPARATUS AND ABNORMALITY DETECTING APPARATUS

(75) Inventors: Chiaki Fujimoto, Tokyo (JP); Masaki Matsushita, Tokyo (JP); Takayuki Kifuku, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/985,861

(22) Filed: Nov. 6, 2001

(65) Prior Publication Data

US 2002/0175645 A1 Nov. 28, 2002

(30) Foreign Application Priority Data

May 22, 2001 (JP) ........................................ 2001-153019

(51) Int. Cl.[7] ............................................... G05B 19/31
(52) U.S. Cl. .................. 318/605; 318/661; 324/207.11; 324/207.13
(58) Field of Search ................................ 318/605, 661; 324/207.11, 207.13

(56) References Cited

U.S. PATENT DOCUMENTS

| 4,034,483 A | * | 7/1977 | Bernstein et al. ............... 434/9 |
| 5,072,173 A | * | 12/1991 | Halder et al. ................ 324/141 |
| 5,189,353 A | * | 2/1993 | Ezuka ........................ 318/605 |
| 5,260,650 A | * | 11/1993 | Schwesig et al. ............ 324/163 |
| 5,332,955 A | * | 7/1994 | Hopper ....................... 318/616 |
| 5,347,277 A | * | 9/1994 | Nondahl et al. ............. 341/112 |
| 5,710,509 A | * | 1/1998 | Goto et al. .................. 318/656 |
| 6,239,571 B1 | * | 5/2001 | Shimahara .................... 310/12 |

FOREIGN PATENT DOCUMENTS

JP  9-126809  5/1997

* cited by examiner

*Primary Examiner*—Rita Leykin
(74) *Attorney, Agent, or Firm*—Sughrue Mion, PLLC

(57) ABSTRACT

A position detecting apparatus includes: a position sensor 10 that inputs an excitation signal having a given period waveform and outputs a first amplitude modified signal induced in accordance with a detected position from a first output winding and outputs a second amplitude modified signal induced in accordance with a detected position from a second output winding; a first phase shifting circuit 23 for electrically shifting a phase of the first amplitude modified signal by a given angle; a second phase shifting circuit 24 for electrically shifting a phase of the second amplitude modified signal by a given angle; converting means 15,16 for converting the signal outputted from the first phase shifting circuit 23 and the signal outputted from the second phase shifting circuit 24 into a phase modulated signal; and calculating means 17–22 for obtaining a detected position on the basis of the phase of the phase modulated signal outputted from the converting means 15,16.

20 Claims, 8 Drawing Sheets

POSITION DETECTING APPARATUS AND ABNORMALITY DETECTING APPARATUS

BACKGROUND OF THE INVENTION

1. Field of the Invention

The present invention relates to a position detecting apparatus and an abnormality detecting apparatus, and more particularly to a resolver for detecting a position or a device for detecting the rotational position such as a synchro, and most particularly to a position detecting apparatus and an abnormality detecting apparatus for detecting the position of a motor for driving a brushless motor.

2. Description of the Related Art

FIG. 7 shows a conventional position detecting apparatus of this type as disclosed in, for example, Japanese Patent Laid-open No. 9-126809. Referring to FIG. 7, for example, a position sensor 10 made up of a resolver is inputted with an excitation signal (sin ωt) which is a sine wave voltage for excitation from an oscillating circuit 22 that generates the excitation signal on the basis of a clock of a counter 12. The position sensor 10 outputs induction signals sin θ sin(ωt±α) and cos θ sin(ωt±α) resulting from amplitude-modulating the excitation signal cos θ and sin θ in response to the rotational position θ. Here, α represents a phase fluctuation error of the output signal to the excitation signal due to a path of from the position sensor 10 to a position detecting circuit or a change in the temperature of a position sensor winding.

One output signal sin θ sin(ωt±α) has its phase shifted by a phase shifting circuit 14 by a given value of 90 degrees, so the output signal becomes a phase shift output sin θ cos (ωt±α). The phase shift signal and another output signal cos θ sin(ωt±α) from the position sensor 10 are added together by an adding circuit to output an addition signal sin(ωt+ θ±α). Similarly, the phase shift signal and another output signal cos θ sin(ωt±α) outputted from the position sensor 10 are subtracted from each other by a subtracting circuit to output a subtraction signal sin(ωt−θ±α).

The excitation signal (sinωt) which is a reference signal is counted with reference to a counter 12. That is, since the excitation signal is counted as one period of from 0 to 360 degrees, a zero-cross point of the addition signal sin(ωt+ θ±α) is detected by a zero-cross detecting circuit 17, and data D1 latched by a latch circuit 19 becomes +θ±α. Similarly, the zero-cross point of the subtraction signal sin(ωt−θ±α) is detected by the zero-cross detecting circuit 18, and data D2 latched by the latch circuit 20 becomes −θ±α. In addition, in an error calculating circuit 21, (D1+ D2)/2 becomes ±α as described above. Therefore, the phase fluctuation error ±α can be calculated. The data D1 and the phase fluctuation error ±α are subtracted from each other by the subtracting circuit 22, thereby being capable of obtaining θ, and also capable of extracting the position θ from which the phase fluctuation error ±α is removed.

Because the conventional position detecting apparatus disclosed in Japanese Patent Laid-Open No. 9-126809 is structured as described above, when the position detecting apparatus fails due to some cause, in particular when the phase shifting circuit 14 fails and the phase shift is not effected, the addition signal becomes sin θ sin(ωt±α)+ cos θ sin(ωt±α)=(sin θ+cos θ)sin(ωt±α), and the subtraction signal becomes sin θ sin(ωt±α)−cos θ sin(ωt±α)=(sin θ−cos θ)sin(ωt±α). Therefore, the data D1 becomes ±α or 180 degrees ±α except that θ is 135 degrees or 315 degrees, and also the data D2 becomes ±α or 180 degrees ±α except that θ is 45 degrees or 225 degrees. Therefore, θ detects any one of ±α, 90 degrees ±α, 180 degrees ±α, and 270 degrees ±α. For simple description, if α is 0, a relationship between the original position (for example, motor rotation position) and the detected position is shown in FIG. 8. The error becomes 135 degrees at the maximum, and in the case where the apparatus is used as a motor rotation position detecting apparatus for driving a brushless synchronous machine, there is the possibility that malfunction occurs such that the apparatus drives the synchronous machine in a direction opposite to a normal drive direction. In order to prevent this drawback, there has been proposed that two position detecting apparatuses are disposed, and two detection results are compared with each other to judge whether a failure occurs, or not. In this proposal, since two position detecting apparatuses are required, it becomes expensive.

Also, in order to calculate the position θ, because the phase fluctuation error ±α is calculated once, and then calculation processing except for the position fluctuation error is required, the structural circuit becomes complicated and expensive.

SUMMARY OF THE INVENTION

The present invention has been made under the above circumstances, and therefore an object of the present invention is to provide a position detecting apparatus and an abnormality detecting apparatus which are capable of minimizing an influence of a failure even if a phase shifting circuit fails.

With the above objects in view, the position detecting apparatus comprises: a position sensor that inputs an excitation signal having a given period waveform and outputs a first amplitude modified signal induced in accordance with a detected position from a first output winding and outputs a second amplitude modified signal induced in accordance with a detected position from a second output winding; a first phase shifting means for electrically shifting a phase of the first amplitude modified signal by a given angle; a second phase shifting means for electrically shifting a phase of the second amplitude modified signal by a given angle; a converting means for converting the signal outputted from the first phase shifting means and the signal outputted from the second phase shifting means into a phase modulated signal; and a calculating means for obtaining a detected position on the basis of the phase of the phase modulated signal outputted from the converting means.

The calculating means may detect a phase difference between the excitation signal and the phase modulated signal to obtain the detected position.

These and other objects, features and advantages of the present invention will become more apparent upon consideration of the following description of the preferred embodiments of the present invention taken in conjunction with the accompanying drawings.

The present invention also resides an abnormality detecting apparatus.

DESCRIPTION OF THE PREFERRED EMBODIMENTS

First Embodiment

Figure 1:
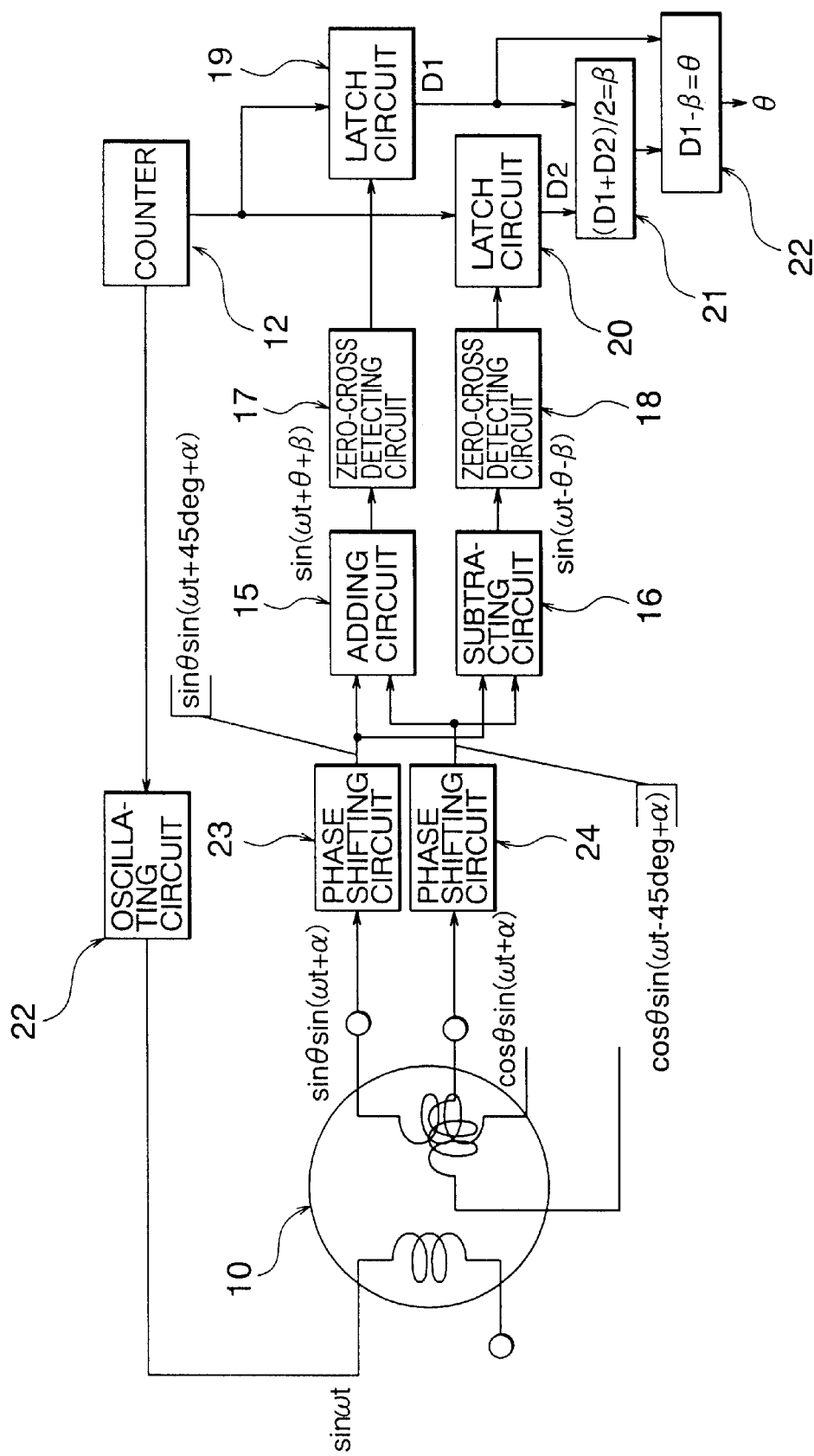
FIG. 1 is a structural view showing the structure of a position detecting apparatus in accordance with a first embodiment of the present invention.

Hereinafter, an embodiment of the present invention will be described with reference to the accompanying drawings. FIG. 1 is a structural view showing the structure of a position detecting apparatus in accordance with the present invention. Referring to the figure, reference numeral 10 denotes a position sensor of one phase excitation input/two phase output type, and for example, is made up of a resolver or the like. The position sensor 10 is not limited to this structure but any type of positions sensors. When supplying an excitation signal having a given frequency, the position sensor 10 outputs amplitude modulated signals which are amplitude-modulated by $\cos\theta$ and $\sin\theta$ in accordance with the detected positions from first and second output windings, respectively. Reference numeral 12 denotes a counter that generates a clock signal, and reference numeral 22 denotes an oscillating circuit that inputs the excitation signal having the given frequency to the position sensor 10 on the basis of the clock signal from the counter 12. Reference numerals 23 and 24 denote phase shifting circuits that electrically shift the phase of the amplitude modulated signal outputted from the position sensor 10 by a given angle. Reference numeral 15 denotes an adding circuit that adds a signal outputted from the phase shifting circuit 23 and a signal outputted from the phase shifting circuit 24 to each other, and reference numeral 16 denotes a subtracting circuit that subtracts the signal outputted from the phase shifting circuit 23 and the signal outputted from the phase shifting circuit 24 from each other. Reference numerals 17 and 18 denote zero-cross detecting circuits that input the output signals of the adding circuit 15 and the subtracting circuit 16, respectively, and detect the zero-cross of the inputted signal. Reference numerals 19 and 20 denote latch circuits input zero-cross detection pulses detected by the respective zero-cross detecting circuits 17 and 18, that is, zero phase detection pulses whose amplitude values are changed from negative to positive as latch pulses, and latch the count value of the counter 12 at the timings of the respective latch pulses. The data D1 and D2 latched in the respective latch circuits 19 and 20 correspond to the phase shifts of the respective output signals of the adding circuit 15 and the subtracting circuit 16 with respect to a reference sine signal $\sin\omega t$. Reference numeral 21 denotes an error calculating circuit that inputs the data D1 and D2 latched in the respective latch circuits 19 and 20 and obtains a phase fluctuation error $\beta$ by calculation of "$(D1+D2)/2(=\beta)$". Reference numeral 22 denotes a subtracting circuit that inputs the data D1 latched in one latch circuit 19 and the value $\beta$ obtained by the error calculating circuit 21 and conducts the subtraction of "$D1-\beta(=\theta)$" to output a correct detected position $\theta$ from which the phase fluctuation error $\beta$ is removed.

Figure 7:
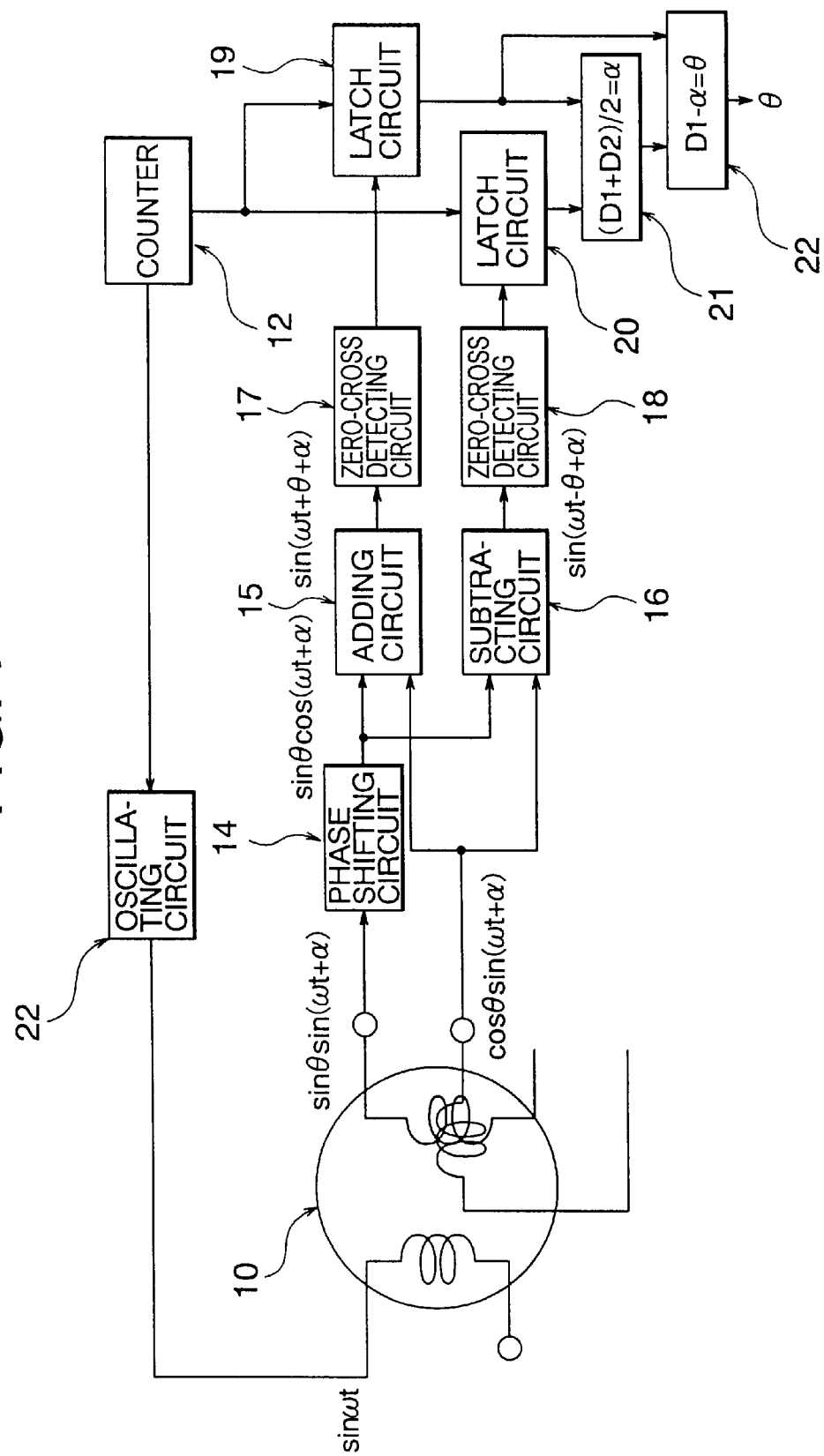
FIG. 7 is a structural view showing a conventional position detecting method.

Then, the operation will be described. First, when the excitation signal $\sin\omega t$ is inputted to the position sensor 10 by the oscillating circuit 22, the position sensor 10 outputs an induction signal, that is, the amplitude modulated signal $\sin\theta\,\sin(\omega t\pm\alpha)$ and $\cos\theta\,\sin(\omega t\pm\alpha)$ as in the conventional example of FIG. 7. Therefore, in the conventional example, as shown in FIG. 7, the phase shifting circuit 14 is disposed on any one of those circuits for inputting a signal, but in the present invention, the phase shifting circuits are disposed on both of two phases, and one output from the position sensor 10 is inputted to the adding circuit 15 and the subtracting circuit 16 through the first phase shifting circuit 23, and another output signal from the position sensor 10 is inputted to the adding circuit 15 and the subtracting circuit 16 through the second phase shifting circuit 24. The electric phase relationship between the first phase shifting circuit 23 and the second phase shifting circuit 24 are so set as to be relatively shifted in phase by 90 degrees. For example, in the phase shifting circuit 23, the phase is shifted by +45 degrees and the output is $\sin\theta\,\sin(\omega t\pm\alpha+45\text{ degrees})$, and in the other phase shifting circuit 24, the phase is shifted by −45 degrees and the output is $\cos\theta\,\sin(\omega t\pm\alpha-45\text{ degrees})$. In this example, assuming that $\pm\alpha-45$ degrees are $\beta$, the output of the first phase shifting circuit 23 becomes $\sin\theta\,\sin(\omega t\pm\beta+90\text{ degrees})=\sin\theta\,\cos(\omega t\pm\beta)$, and the output of the second phase shifting circuit 24 becomes $\cos\theta\,\sin(\omega t\pm\beta)$. The output signal of the adding circuit 15 becomes $\sin(\omega t\pm\beta+\theta)$, and the output signal of the subtracting circuit 16 becomes $\sin(\omega t\pm\beta-\theta)$. In this way, the signals outputted from the phase shifting circuits 23 and 24 are added or subtracted by the adding circuit 15 and the subtracting circuit 16 so as to be converted into the phase modulated signals $\sin(\omega t\pm\beta+\theta)$ and $\sin(\omega t\pm\beta-\theta)$. Thereafter, the data D1 and the data D2 are calculated through the zero-cross detecting circuits 17, 18 and the latch circuits 19, 20 as in the conventional example. In the zero-cross detection, any one of the rising edge and the falling edge is detected, thereby being capable of calculating $\theta$ by the calculating circuits 21 and 22. Also, the provision of a process of calculating $(D1+D2)/2$ enables $(D1-D2)/2=\theta$ and the position $\theta$ to be detected.

$\beta$ may be regarded as the phase fluctuation error which is set by the phase shifting circuit and added to $\alpha$ by +45 degrees, and the phase fluctuation error in the conventional example may be regarded as $\beta-45$ degrees. In this case, $\pm\alpha$ is the error fluctuation having a temperature characteristic as in the conventional example, so it can be treated as the temperature detection data. Therefore, if a relationship between the above phase fluctuation error and the temperature is set in advance, the temperature is measured by detecting the above position fluctuation error. For example, in the position sensor equipped together with the motor, the temperature of the motor and the surrounding temperature of the motor can be measured. Accordingly, when the motor is exposed to a high temperature or heated at a high temperature, if there is the possibility that the motor fails when the temperature rises higher than that temperature, a current for driving the motor is controlled to be limited or stop on the basis of the above position fluctuation error, thereby being capable of preventing the failure of the motor in advance.

Figure 2:
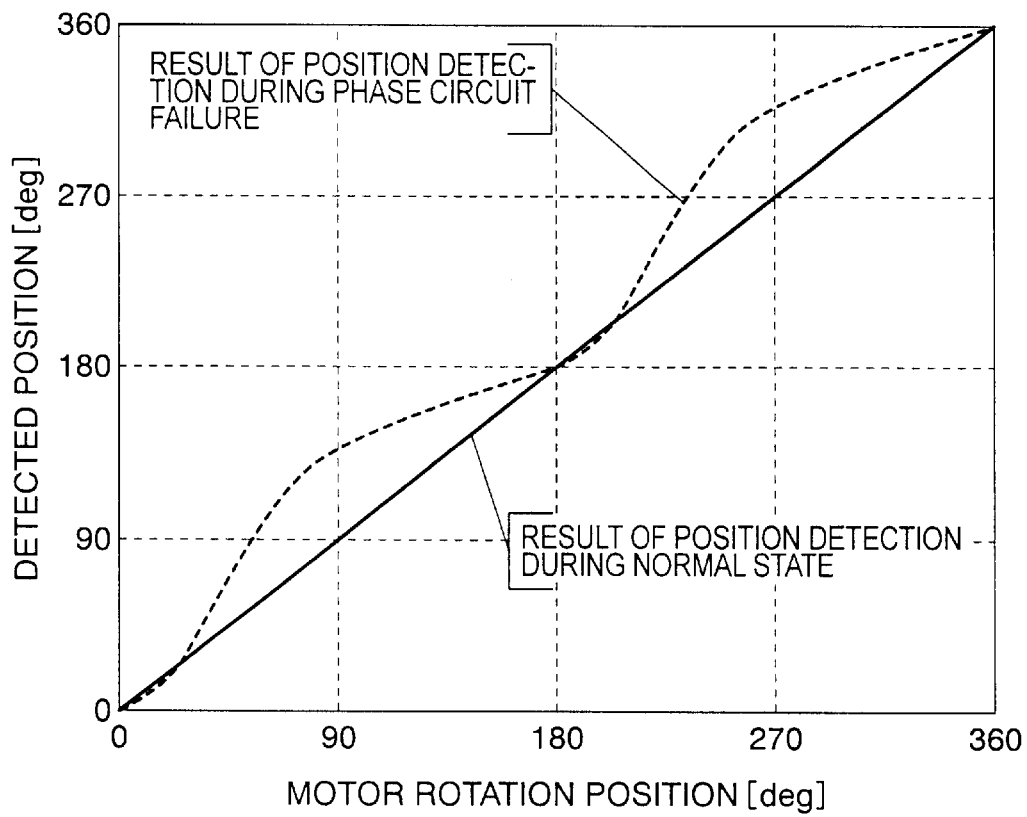
FIG. 2 is an explanatory diagram showing the results of position detection in accordance with the first embodiment of the present invention.
Figure 8:
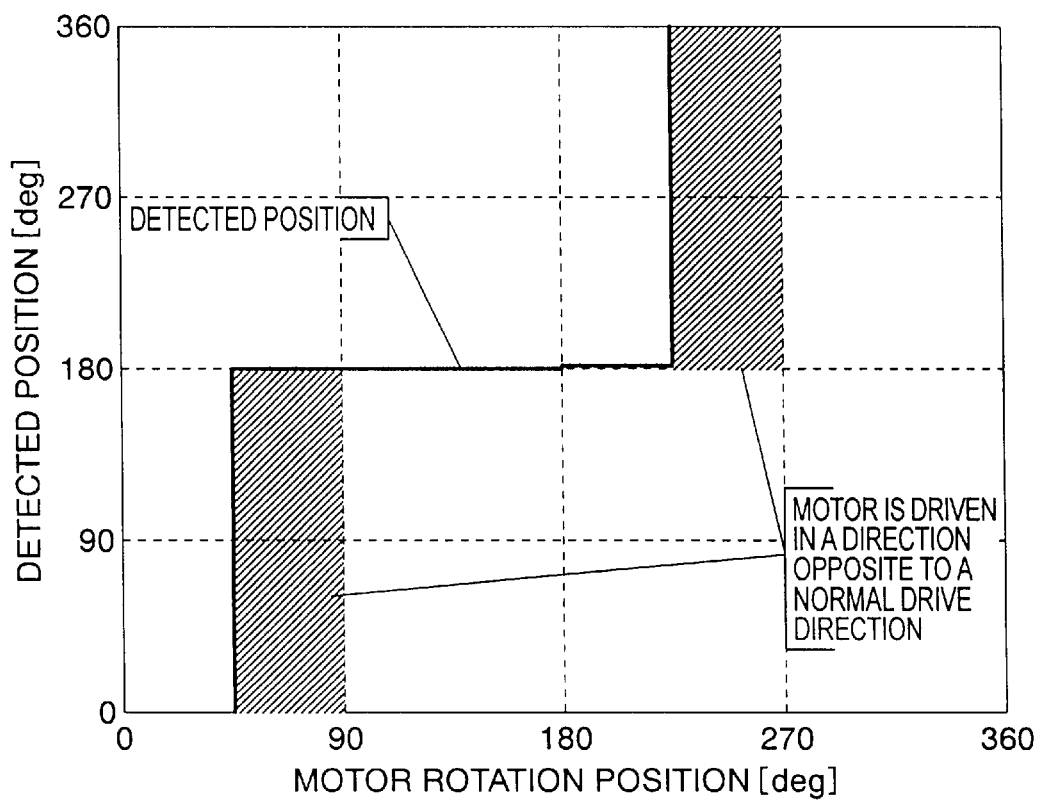
FIG. 8 is an explanatory diagram showing the position detection result in an abnormal state obtained by the conventional position detecting method.

In general, when a circuit fails, the possibility that the circuit fails at two portions at the same time is extremely low, and normally, in the failure mode and the effects analysis of the apparatus, attention is paid to the failure of only one portion of the circuit and analysis is made. Therefore, in the present invention, it may be assumed that one of the phase shifting circuits fails. Assuming that the second phase shifting circuit 24 fails and does not conduct the phase shifting, cos θ sin(ωt±α) is satisfied. Therefore, the adding circuit 15 outputs sin θ sin(ωt±α+45 degrees)+ cos θ sin(ωt±α), and the subtracting circuit 16 outputs sin θ sin(ωt±α +45 degrees)−cos θ sin(ωt±α). For brief description, if α is 0, the relationship between the original position (for example, the motor rotating position) and the detected position is shown in FIG. 2. As shown in FIG. 2, the error in the detected position is small as compared with FIG. 8 showing the position detection when the circuit fails in the conventional example shown in FIG. 7. As described above, the error becomes smaller as the relative phase shift angle is close to a desired angle, but becomes larger as it is far from the desired angle. Therefore, since the phase shifting circuit is disposed in each of two phases of the winding output signals, even if one phase shifting circuit fails, another phase shifting circuit shifts the phase, as a result of which the position detection error can reduce the error as large as another phase shift angle. Since those two phase shifting circuits are disposed, the probability that each of those phase shifting circuits fails is the same, the same phase shift angle should be set, and if the position sensor is going to shift the phase so that the amplitude modulated signals orthogonal to each other are converted into the phase modulated signals, the relative phase angle is 90 degrees. Since the relative phase angle is divided into two, when two phase shift angle is set to ±45 degrees, an influence of the failure can be suppressed to the minimum. For example, even if the motor rotation position is used as the detected position in a device for driving a brushless synchronous device, an influence of the malfunction is small without driving the motor drive in a reverse direction.

Figure 6:
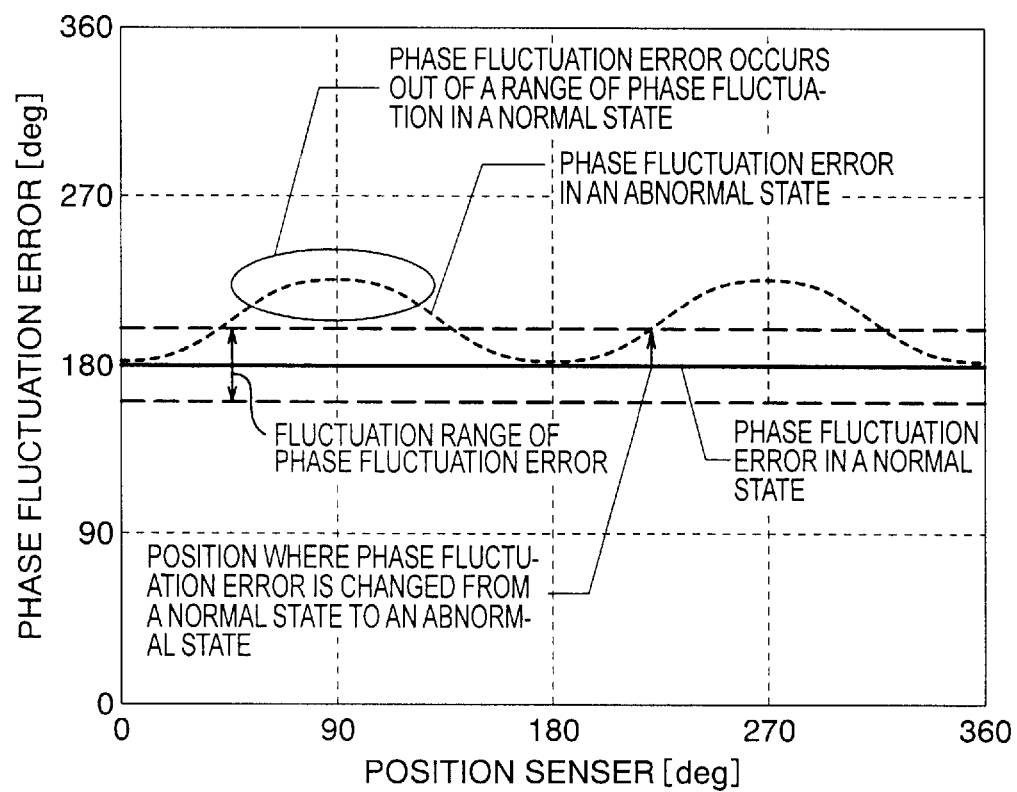
FIG. 6 is an explanatory diagram showing a phase fluctuation error in accordance with a third embodiment of the present invention.

When abnormality occurs in the position detecting device and an error occurs in the position detection as shown in FIG. 2, the phase fluctuation error fluctuates due to the position as shown in FIG. 6, likewise. As is apparent from this fact, the phase fluctuation error during the normal operation gradually changes without rapidly occurring the rising of temperature because the phase fluctuation error depends on the temperature. However, since the normal state rapidly changes to the abnormal state during the abnormal operation, the phase fluctuation error also rapidly changes. The abnormality of the position detecting device can be judged by catching the rapid change. Also, since the phase fluctuation error changes due to the position, in a system where the position always changes, although the position gradually changed due to the temperature during the normal operation since the phase fluctuation error changes in accordance with the position during the abnormal operation, the abnormality can be judged by judging the change of the phase fluctuation error. As a result, the position detecting apparatus according to the present invention can be used as the abnormal detecting apparatus.

In addition, in the case where a change amount of the phase fluctuation error within the temperature range using the position sensor, the position detecting apparatus or the like, that is, a fluctuation range of the phase fluctuation error is small, if the phase fluctuation error occurs out of a range of the phase fluctuation error as shown in FIG. 6, it can be judged as the abnormality. Even if the position is within the phase fluctuation range, when the error in the position detection is small in the abnormal operation as is apparent from the comparison of FIG. 2 with FIG. 6, the phase fluctuation error is small. That is, when the phase fluctuation error is within the fluctuation range, even if the abnormality cannot be detected, since the error in the position detection is small, an influence of the error becomes further small.

A method of detecting the abnormality of the position detecting apparatus can be applied to not only the present invention but also the conventional example having only one phase shifting circuit. That is, the present invention has a purpose of minimizing an influence of the failure on the position detection by providing two phase shifting circuits. The same is applied to the phase fluctuation error. Therefore, in a device where the phase shifting means is disposed in only one phase as in the conventional example, the phase fluctuation error has a larger fluctuation during the failure, and the abnormality is further readily detected.

In the case where the position detecting apparatus is used as a position detecting apparatus for driving the motor, if the abnormality is judged as described above, the drive of the motor stops, thereby being capable of preventing the malfunction.

The zero-cross detection is made assuming one of the rising edge and the falling edge is detected in this example, however, both of the rising edge and the falling edge may be detected. In this case, since a period becomes half, it is necessary that the detected count is doubled and calculated. Also, latching may be made in the rising edges of the adding circuit 15 and the subtracting circuit 16 for calculation, and latching may be made in the falling edges of the adding circuit 15 and the subtracting circuit 16 for calculation. If both of the rising edge and the falling edge are used, because the position can be detected for each of half periods, which may be conventionally conducted only for an oscillating period, the position can be detected at a higher speed. In addition, the detection at the zero-cross point has been proposed, but in order to prevent the detection error caused by the noise received by the circuit or the failure of the apparatus, a hysteresis may be provided at the zero-cross point for detection.

As described above, the position detecting circuit according to the present invention can minimize an influence of the failure even if the phase shifting circuit fails. Also, in the case where the position detecting circuit according to the present invention is used to drive the motor as described above, the malfunction can be prevented. In addition, the position detecting circuit according to the present invention can be used as an abnormality detecting apparatus that detects the abnormality of the position detection without newly adding a method for detecting the circuit abnormality. Since the position θ can be obtained without the provision of a calculating process of calculating the position fluctuation error, the position detection and the abnormality detection can be conducted inexpensively.

Second Embodiment

Figure 3:
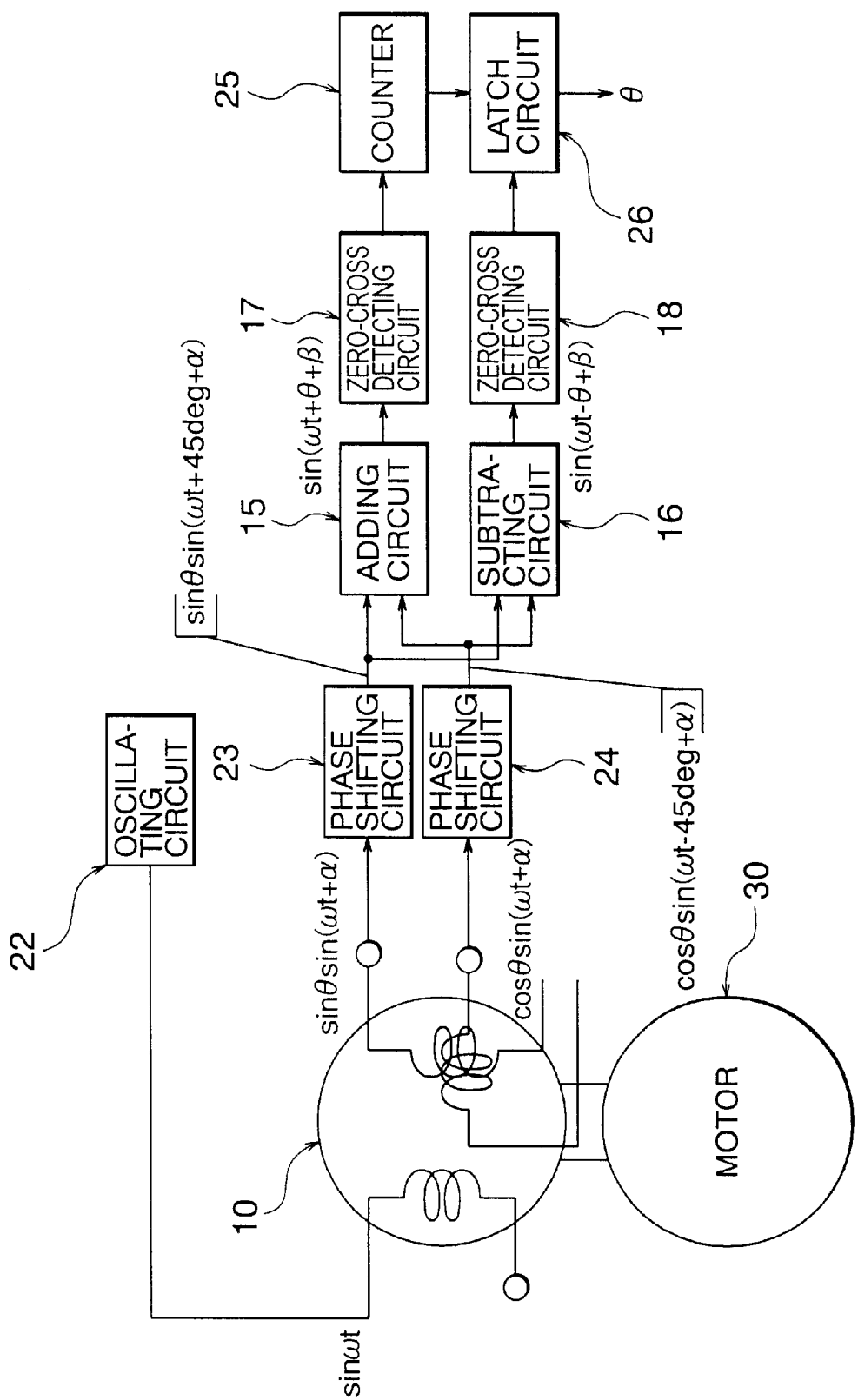
FIG. 3 is a structural view showing a position detecting apparatus in accordance with a second embodiment of the present invention.

FIG. 3 is a block diagram showing the structure of a position detecting apparatus in accordance with this embodiment. In the figure, reference numeral 30 denotes a brushless motor having an n-pole logarithm which is coupled directly to the position sensor 10, and the motor rotation position is detected by the position sensor 10. Reference numeral 25 denotes a counter that counts a time difference d between the zero-cross point of a signal outputted from the adding circuit 15 and the zero-cross point of a signal outputted from the subtracting circuit 16. Reference numeral 26 denotes a latch circuit that inputs a zero-cross detection pulse detected by the respective zero-cross detecting circuits 18, that is, a zero phase detection pulse as a latch pulse and latches the count value of the counter 25 at a timing of the latch pulse. Because other structures are identical with those in the above-mentioned first embodiment, the same parts are denoted by identical reference and their description will be omitted.

Figure 4:
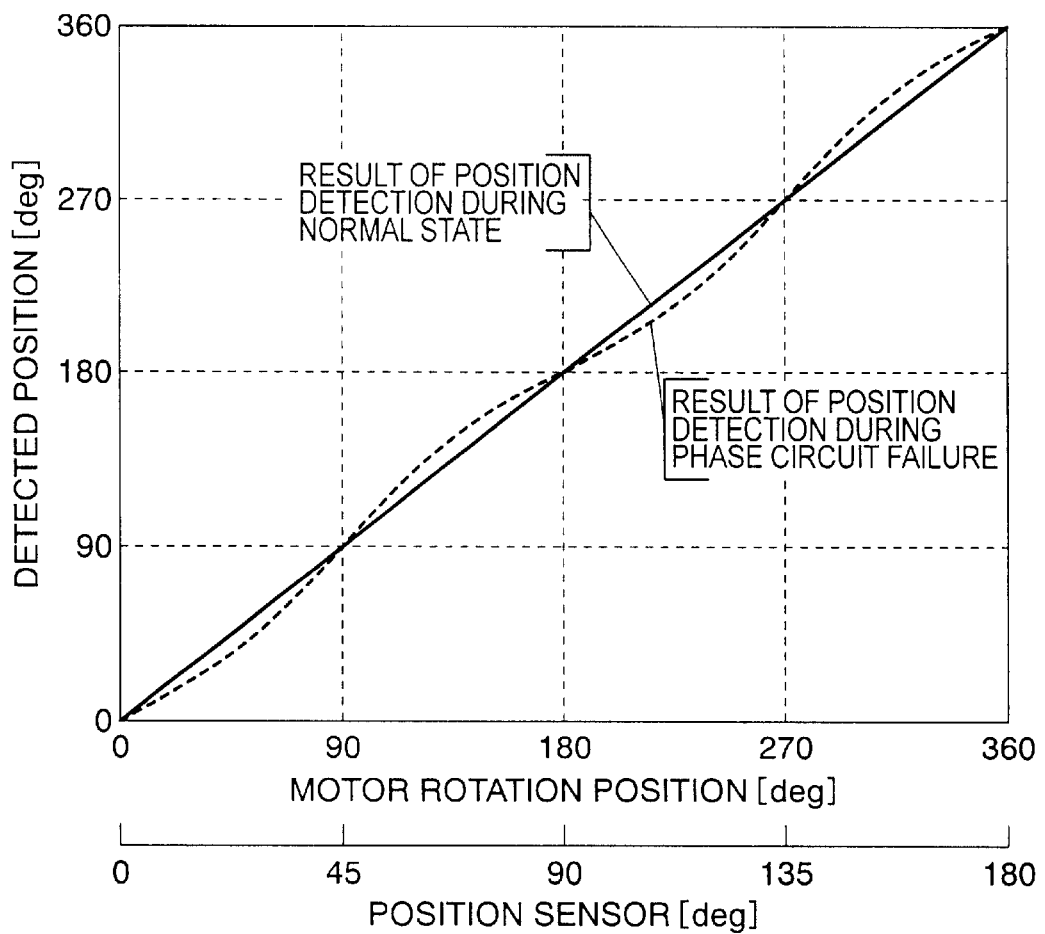
FIG. 4 is an explanatory diagram showing the results of the position detection in accordance with the second embodiment of the present invention.

When the brushless motor having the n-pole logarithm is driven, it is general to use the position sensor of n-axial double angle with N period as one rotation of the motor. This is because in the motor drive per se, if attention is paid to only one pole, the rotation position detected by the position sensor corresponds to the electric angle of the motor, and the detected position can be adapted to the motor control as it is. However, in the detecting method according to this embodiment, as is apparent from the above embodiment, the phase difference between the output sin ($\omega t \pm \beta + \theta$) from the adding circuit 15 and the output sin($\omega t \pm \beta - \theta$) from the subtracting circuit 16 becomes $2\theta$. In this example, if the electric angle of the motor is set to be $2\theta$, when the phase difference between the output signal of the adding circuit 15 and the output signal of the subtracting circuit 16, that is, the time difference of the zero cross is measured, it can be replaced by an electric angle capable of being adapted to the motor control as it is. Therefore, it is unnecessary to calculate the detected position after the phase fluctuation error is calculated once as in the conventional example, and as shown in FIG. 3, the time difference d between the zero cross point of the signal outputted from the adding circuit 15 and the zero cross point of the signal outputted from the subtracting circuit 16 is counted. The output signals of the adding circuit 15 and the subtracting circuit 16 are repeated at a given period of $2\pi/\omega$, thereby d×$\omega$ becomes an electric angle. For example, the detected position when the motor is a four-pole pair and the position sensor is a two axial double angle is shown in FIG. 4. Also, as is shown in the above embodiment, the detected angle when one of the phase shifting circuits fails is shown together. As is apparent from this, even if the phase shifting circuit fails, the error is small and an influence of the error on the motor control is slight.

In this example, the given period is set to $2\pi/\omega$, however, there is the possibility that $\omega$ fluctuates due to an influence of the part variation of the oscillating circuit, and therefore a period T where the zero cross point of the adding circuit 15 or the subtracting circuit 16 occurs is measured, and adapted to the time difference d so that the given period becomes $2\pi/T$.

The position sensor of the M axial double angle can be adapted to a pole logarithm motor of (the magnification of 2)×M. For example, three axial double angle may be applied to the motor of the six pole logarithm as described above, but may be applied to one axial double angle. In this case, if this embodiment is adapted to the sensor position $\theta$, $2\theta$ can be detected and is then ⅓ calculated. The electric angle can be calculated with $2\theta/3$.

As described above, in the position detecting apparatus according to this embodiment, the electric angle of the motor is set to be $2\theta$, the phase difference between the output signal of the adding circuit 15 and the output signal of the subtracting circuit 16, that is, the time difference of the zero cross is measured and can be then replaced by the electric angle used in the motor control. Thus, even if the phase shifting circuit fails, the influence of the failure can be minimized. Also, in the case where the position detecting apparatus of this embodiment is used in the above-mentioned motor drive, the malfunction can be prevented.

Third Embodiment

Figure 5:
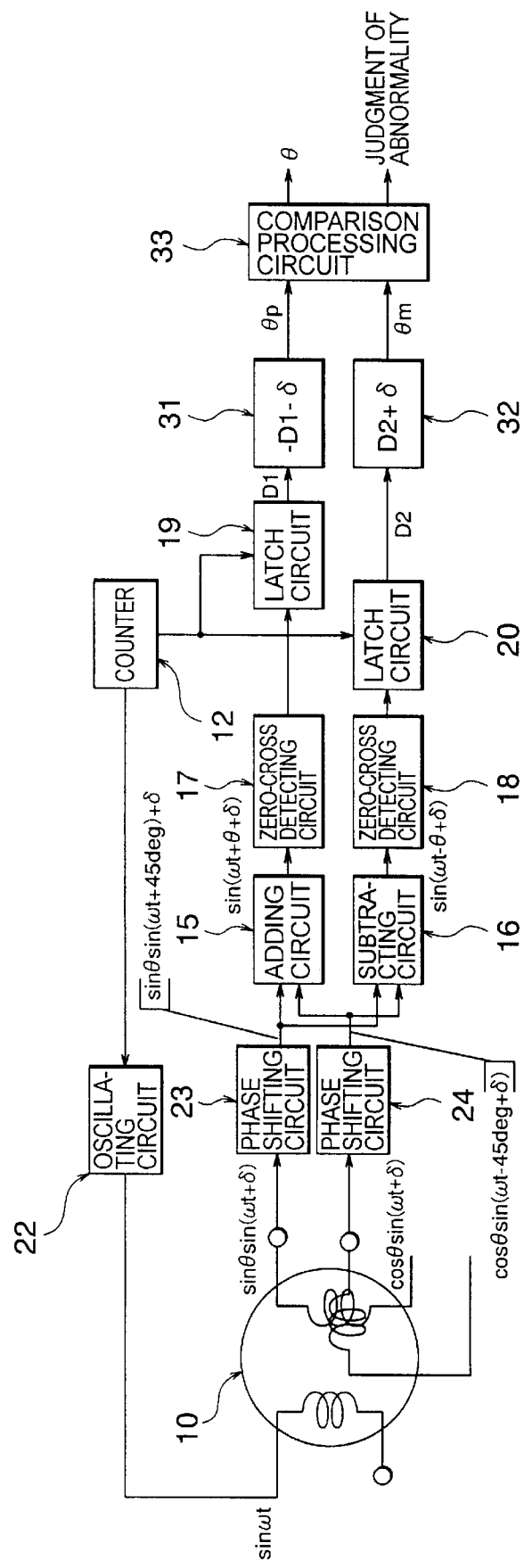
FIG. 5 is a structural view showing a position detecting apparatus in accordance with a third embodiment of the present invention.

FIG. 5 is a block diagram showing the structure of a position detecting apparatus in accordance with this embodiment. In the figure, reference numeral 31 denotes a position calculating circuit that inputs the data D1 latched in the latch circuit 19 and obtains the position $\theta p$ by the calculation of "$-D1-\delta(=\theta p)$". Reference numeral 32 denotes a position calculating circuit that inputs the data D2 latched in the latch circuit 20 and obtains the position $\theta m$ by the calculation of "$D2+\delta(=\theta m)$". Reference numeral 33 denotes a comparison processing circuit that calculates the average values of $\theta p$ and $\theta m$ taking the shifts of the positions $\theta p$ and $\theta m$ into consideration due to the noises received in the detecting circuit into consideration to output the average values as $\theta$. The comparison processing circuit 33 judges the abnormality in the case where $\theta p$ and $\theta m$ are largely different from each other, that is, a difference between $\theta p$ and $\theta m$ is equal to or larger than a given threshold value. Because other structures are identical with those in the above-mentioned first embodiment, the same parts are denoted by identical references, and in this example, their description will be omitted.

When the output winding of the position sensor, and a path extending from the position sensor to the position detecting apparatus is longer, the phase fluctuation error appears in the output due to an influence of a temperature or the like. On the other hand, the length of the path is shorter, a factor such as the temperature which fluctuates becomes small, and the amount of phase fluctuation becomes sufficiently small. In this case, the amount becomes a level without any problem even if it is regarded as the phase fixed error $\delta$. In this case, when the excitation signal sin $\omega t$ outputted from the oscillating circuit shown in FIG. 5 and a synthetic signal sin ($\omega t + \theta + \delta$) outputted from the adding circuit 15 shown in the present invention are allowed to pass through the zero cross detecting circuit 17 and then latched by the latch circuit 19, the phase difference of $-\theta-\delta$ is detected from the latched data D1. Also, when a synthetic signal sin ($\omega t - \theta + \delta$) outputted from the subtracting circuit 16 is allowed to pass through the zero cross detecting circuit 18 and then latched by the latch circuit 20, the phase difference of $\theta-\delta$ (is detected from the latched data D2. In this example, assuming that the phase error $\delta$ is a fixed value, since that value is determined in structuring the apparatus in advance, the processings 31 and 32 for subtracting the fixed phase error $\delta$ from the detected data D1 and D2 are conducted, thereby being capable of detecting the positions $\theta p$ and $\theta m$. One of $\theta p$ and $\theta m$ may be used as the position $\theta$. With this, another detecting circuit can be omitted, and the apparatus can be structured inexpensively. Also, there is the possibility that the detected positions $\theta p$ and $\theta m$ are slightly shifted due to the noise received in the detecting circuit, so the average values of the detected positions $\theta p$ and $\theta m$ are calculated by the comparison processing circuit 33 as the position $\theta$, and thus the precision can be improved. Also, in the case where the positions $\theta p$ and $\theta m$ are largely different from each other, it is presumed that an abnormality occurs in the detecting apparatus, thereby being capable of conducting the judgment of the abnormality. In addition, in the case where the detecting apparatus is used for the motor control or the like, an instruction is made so as to stop the control.

In this embodiment, in the case where the amount of fluctuation is small to the degree that the phase fluctuation error is a fixed value, the sensitivity out of the fluctuation range of the phase fluctuation error described in the first embodiment can be further enhanced, thereby further facilitating the detection of abnormality.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments with various modifications as are suited to the particular use contemplated. It is intended that the scope of the invention be defined by the claims appended hereto, and their equivalents.

What is claimed is:

1. A position detecting apparatus comprising:
    a position sensor that receives an excitation signal having a given period waveform and outputs a first amplitude-modified signal induced in accordance with a detected position from a first output winding and outputs a second amplitude modified signal induced in accordance with a detected position from a second output winding;
    a first phase shifting means for electrically shifting a phase of said first amplitude modified signal by a given angle;
    a second phase shifting means for electrically shifting a phase of said second amplitude modified signal by a given angle;
    a converting means for converting the signal outputted from said first phase shifting means and the signal outputted from said second phase shifting means into a phase modulated signal; and
    a calculating means for obtaining a detected position on the basis of the phase of said phase modulated signal outputted from said converting means.

2. A position detecting apparatus according to claim 1, wherein said calculating means detects a phase difference between said excitation signal and said phase modulated signal to obtain the detected position.

3. A position detecting apparatus according to claim 2, wherein said calculating means measures a time difference between a time when said excitation signal makes zero cross and a time when said phase modulated signal makes zero cross and calculates the position by subtracting a given phase error amount from the time difference.

4. A position detecting apparatus according to claim 1, wherein said converting means includes an adding means for adding the signal outputted from said first phase shifting means and the signal outputted from said second phase shifting means to calculate a first phase modulated signal; and
    a subtracting means for subtracting the signal outputted from said first phase shifting means from the signal outputted from said second phase shifting means to calculate a second phase modulated signal; and
    wherein said calculating means detects a phase difference between the first phase modulated signal outputted from said adding means and the second phase modulated signal outputted from said subtracting means to obtain the detected position.

5. A position detecting apparatus according to claim 4, wherein said calculating means measures a time difference between a time when said first phase modulated signal makes zero cross and a time when said second phase modulated signal makes zero cross to obtain the detected position.

6. A position detecting apparatus according to claim 4, wherein said converting means comprises:
    a first phase detecting means for detecting a phase difference between said first phase modulated signal and said excitation signal; and
    a second phase detecting means for detecting a phase difference between said second phase modulated signal and said excitation signal; and
    wherein said calculating means obtains the detected position by a first phase difference outputted from said first phase difference detecting means and a second phase difference outputted from said second phase difference detecting means.

7. A position detecting apparatus according to claim 6, wherein said calculating means includes an error calculating means for obtaining a position detection error due to a difference between said first phase error and said second phase error; and
    an error removing means for removing said position detection error from said first phase difference and said second phase difference.

8. The position detecting apparatus according to claim 1, wherein said calculating means detects a phase difference of said first phase modulated signal or said second phase modulated signal with reference to a signal obtained by synthesizing said first amplitude modulated signal and said second amplitude modulated signal, to thereby obtain the detected position.

9. A position detecting apparatus according to claim 7, wherein said position detection error is used as temperature detection data.

10. A position detecting apparatus according to claim 9, wherein said position detecting apparatus is used to drive a motor and limits a current for driving the motor due to said position detection error.

11. A position detecting apparatus according to claim 1, wherein a phase shift angle at which said first phase shifting means shifts a phase and a phase shift angle at which said second phase shifting means shifts a phase are set in accordance with an angle at which said amplitude modulated signals outputted from said first output winding and said second output winding electrically cross each other.

12. A position detecting apparatus according to claim 11, wherein a relative phase shifting angle of said first phase shifting means and said second phase shifting means are orthogonal to each other.

13. A position detecting apparatus according to claim 11, wherein when said first phase shifting means or said second phase shifting means fails, said detected position sets the phase shift angles so that the position detection error due to the failure becomes minimum.

14. A position detecting apparatus according to claim 1, wherein the amplitude modified signal outputted with 1/M (M is a natural number) of the entire circumference as one period in accordance with a rotor position by said output winding has a given periodic waveform; wherein when said position detecting apparatus is used as the position detecting apparatus of a brushless synchronous motor whose pole logarithm is N, the pole logarithm N is the magnification of M, and the magnification of 2.

15. An abnormality detecting apparatus comprising:
    a position sensor that receives an excitation signal having a given period waveform and outputs a first amplitude modified signal induced in accordance with a detected position from a first output winding and outputs a second amplitude modified signal induced in accordance with a detected position from a second output winding;
    a phase shifting means for electrically shifting the phase of any one of said first amplitude modulated signal and said second amplitude modulated signal by a given angle;

a converting means for adding or subtracting the other signal of said first amplitude modulated signal and said second amplitude modulated signal by a signal outputted from said phase shifting means so as to be converted into a phase modulated signal;

a calculating means for detecting the phase of said phase modulated signal outputted from said converting means to obtain the detected position; and an abnormality judging means for judging whether the position detection operation is abnormal or not by detecting said phase.

16. An abnormality detecting apparatus comprising:

a position sensor that receives an excitation signal having a given period waveform and outputs a first amplitude modified signal induced in accordance with a detected position from a first output winding and outputs a second amplitude modified signal induced in accordance with a detected position from a second output winding;

a first phase shifting means for electrically shifting a phase of said first amplitude modified signal by a given angle;

a second phase shifting means for electrically shifting a phase of said second amplitude modified signal by a given angle;

a converting means for converting the signal outputted from said first phase shifting means and the signal outputted from said second phase shifting means into a phase modulated signal;

a calculating means for obtaining a detected position on the basis of the phase of said phase modulated signal outputted from said converting means; and an abnormality judging means for judging that the position detection operation is abnormal by detecting said phase, wherein said converting means comprises:

an adding means for adding the signal outputted from said first phase shifting means and the signal outputted from said second phase shifting means to calculate a first phase modulated signal; and a subtracting means for subtracting the signal outputted from said second phase shifting means from the signal outputted from said first phase shifting means to calculate a second phase modulated signal;

a first phase difference detecting means for detecting a phase difference between the first phase modulated signal outputted from said adding means and the second phase modulated signal outputted from said subtracting means;

a second phase difference detecting means for detecting a phase difference between said second phase difference modulated signal and said excitation signal;

an error calculating means for obtaining a position detection error due to the first phase difference outputted from said first phase difference detecting means and the second phase difference outputted from said second phase difference detecting means; and an abnormality judging means for judging that the position detection operation is abnormal by detecting said position detection error.

17. An abnormality detecting apparatus according to claim 16, wherein when said position detection error is out of a given range, it is judged that the position detection operation is abnormal.

18. An abnormality detecting apparatus according to claim 16, wherein when said position detection error rapidly changes, it is judged that the position detection operation is abnormal.

19. An abnormality detecting apparatus according to claim 16, wherein said abnormality judging means judges that the position detection operation is abnormal if the position detection is a given value.

20. An abnormality detecting apparatus according to claim 16, wherein said position sensor is coupled directly to a motor so as to detect the motor rotation position;

wherein said apparatus further comprises a drive circuit for driving the motor; and wherein when said abnormality judging means judges that the position detection operation is abnormal, the control for driving the motor is interrupted and the motor drive is inhibited.

* * * * *